(12) United States Patent
Fletcher et al.

(10) Patent No.: US 11,766,680 B2
(45) Date of Patent: Sep. 26, 2023

(54) FILTER SUB-ASSEMBLY

(71) Applicant: MANN+HUMMEL GmbH, Ludwigsburg (DE)

(72) Inventors: Neil Fletcher, Somerset (GB); Anthony W. Fell, Somerset (GB); Vikas Jilakarapalli Prabhakar, Bangalore (IN); Robin Nash, Somerset (GB)

(73) Assignee: MANN+HUMMEL GmbH, Ludwigsburg (DE)

( * ) Notice: Subject to any disclaimer, the term of this patent is extended or adjusted under 35 U.S.C. 154(b) by 548 days.

(21) Appl. No.: 16/892,627

(22) Filed: Jun. 4, 2020

(65) Prior Publication Data

US 2020/0384481 A1 Dec. 10, 2020

(30) Foreign Application Priority Data

Jun. 6, 2019 (GB) .................................. 1908096.9

(51) Int. Cl.
| | |
|---|---|
| *B04B 1/08* | (2006.01) |
| *B04B 5/00* | (2006.01) |
| *B04B 7/12* | (2006.01) |
| *B04B 15/06* | (2006.01) |
| *F16J 15/16* | (2006.01) |

(52) U.S. Cl.
CPC ................ *B04B 1/08* (2013.01); *B04B 5/005* (2013.01); *B04B 7/12* (2013.01); *B04B 15/06* (2013.01); *F16J 15/164* (2013.01)

(58) Field of Classification Search
CPC .. B04B 1/08; B04B 5/005; B04B 7/12; B04B 15/06; B04B 7/08; F16J 15/164; F01M 11/03; B01D 21/262
See application file for complete search history.

(56) References Cited

U.S. PATENT DOCUMENTS

2018/0195615 A1    7/2018  Burford et al.

FOREIGN PATENT DOCUMENTS

| CA | 980746 A | 12/1975 |
|---|---|---|
| DE | 1123159 B | 2/1962 |
| WO | 2017041205 A1 | 3/2017 |

*Primary Examiner* — Shuyi S. Liu

(57) ABSTRACT

There is provided a filter sub-assembly that comprises a rotary vessel having a rotor body and a closure member to close an opening of the rotor body. The sub-assembly further comprises a liner that is receivable within the rotor body to line an inner surface thereof. The liner is also fluidly sealable to the closure member by a centrifugal force directed radially outwardly from an axis of rotation, about which the rotary vessel is rotatable. The sub-assembly has particular application in a centrifugal filter of a motor vehicle, for example for cleaning engine oil in an engine lubrication system.

18 Claims, 4 Drawing Sheets

FILTER SUB-ASSEMBLY

CROSS-REFERENCE TO RELATED APPLICATION

This application claims a priority date of 6 Jun. 2019 based on prior filed United Kingdom patent application No. GB 1908096.9, the entire contents of the aforesaid United Kingdom application being incorporated herein by reference to the fullest extent permitted by the law.

TECHNICAL FIELD

The invention relates to a filter sub-assembly, particularly a filter sub-assembly for use in a centrifugal filter, such as used in a motor vehicle for cleaning engine oil.

BACKGROUND

Centrifugal filter assemblies are known for removing contaminant particles from lubricating oil circuits of internal combustion engines. They are also known for separating particulate matter from liquids, as well as separating liquids of different densities from one another, in a variety of industrial processes. Typically, a centrifugal filter comprises a housing having a rotor supported therein to spin about a spindle, the spindle providing an axis of rotation. A working fluid from which a contaminant is to be removed, for example engine oil, is supplied at elevated pressure along the axis of rotation to the rotor. Subsequently, the pressurised fluid is tangentially ejected from the rotor such that the rotor is caused to spin. As the working fluid flows through the spinning rotor, denser contaminants or particles are separated therefrom by centrifugal force and retained in the rotor, typically as a cake adhering to an interior surface of the rotor. Ejected fluid usually drains to a sump.

As retained contaminant particles agglomerate in the rotor, it is necessary to replace or service the rotor at suitably regular intervals, to ensure the continued cleaning efficacy of the filter. Insertable liners are often used to line the interior surface of the rotor, to aid cleaning in that contaminant particles become caked onto the liner, which is removable, and disposable, instead of the interior surface. Assembly and disassembly of the rotor is thus required at service intervals, which can be time consuming and require specialist tools. It is desirable to improve the ease with which the rotor may be serviced.

SUMMARY OF THE INVENTION

It is an object of embodiments of the invention to at least mitigate one or more problems of known arrangements.

According to an aspect of the invention, there is provided a filter sub-assembly comprising: a rotary vessel having a rotor body and a closure member to close an opening of the rotor body; and a liner receivable within the rotor body to line an inner surface thereof and fluidly sealable to the closure member by a centrifugal force directed radially outwardly from an axis of rotation about which the rotary vessel is rotatable. Embodiments of the invention may simplify assembly and/or disassembly of the filter sub-assembly, thus improving the ease with which the rotor may be serviced, and/or may negate a requirement for a separate, or further, seal, for example an O-ring seal, to seal the rotor body to the closure member.

In certain embodiments, the closure member may comprise a radially inwardly facing sealing surface, relative to the axis of rotation, against which the liner is fluidly sealable by the centrifugal force. The closure member may comprise a ridge that provides the radially inwardly facing sealing surface.

In certain embodiments, the liner may comprise a radially outwardly facing sealing surface, relative to the axis of rotation, which is fluidly sealable against the closure member, that is at least a portion there of, by the centrifugal force. The liner may be fluidly sealable to the closure member in that the liner, or at least a portion thereof, is deformable by the centrifugal force to seal against the closure member. The liner may be monolithic and/or be formed of a resiliently deformable material.

In certain embodiments, the liner may comprise a wall extending between opposing first and second ends of the liner, the wall having an edge region proximate the first end that provides the radially outwardly facing sealing surface. The edge region may comprise a radially inwardly deflected portion of the wall, relative to the axis of rotation, that provides the radially outwardly facing sealing surface. The radially inwardly deflected portion may be deformable by the centrifugal force to seal against the closure member.

The edge region may comprise a projecting portion disposed radially outwardly of the radially outwardly facing sealing surface, relative to the axis of rotation, to form a channel in which the radially inwardly facing sealing surface is receivable. The projecting portion may provide a spacer to create or maintain a space between the inner surface of the rotor body and the wall and/or between the inner surface of the rotor body the closure member, or a portion thereof.

In certain embodiments, the edge region may have a thickness different to that of the remainder of the wall, including one of a greater thickness and a lesser thickness. The radially inwardly deflected portion may have a thickness different to that of the remainder of the wall, including one of a greater thickness and a lesser thickness. The projecting portion may have a thickness different to that of the remainder of the wall, including one of a greater thickness and a lesser thickness.

The opening of the rotor body may be closable by insertion of the closure member, that is at least a portion thereof, into the opening and/or may be an open end of the rotor body. In certain embodiments, the rotor body may comprises a pair of diametrically opposed nozzles, relative to the axis of rotation, configured to eject a working fluid from the rotor body in a direction generally tangential to the rotor body.

According to another aspect of the invention, there is provided a centrifugal filter comprising: the filter sub-assembly as above-described; and a housing within which the filter sub-assembly is supported, the housing having a base and a cover attachable, including but not limited to separably attachable, to one another to at least introduce the filter sub-assembly into the housing. Optionally, the centrifugal filter may comprise a spindle extending from the base upon which the rotary vessel is mountable to rotate about the spindle, the spindle delimiting the axis of rotation.

According to another aspect of the invention, there is provided vehicle comprising a filter sub-assembly as above-described or a centrifugal filter as above-described.

BRIEF DESCRIPTION OF THE DRAWINGS

Embodiments of the invention will now be described, by way of example only, with reference to the accompanying figures, in which.

DETAILED DESCRIPTION

Figure 1:
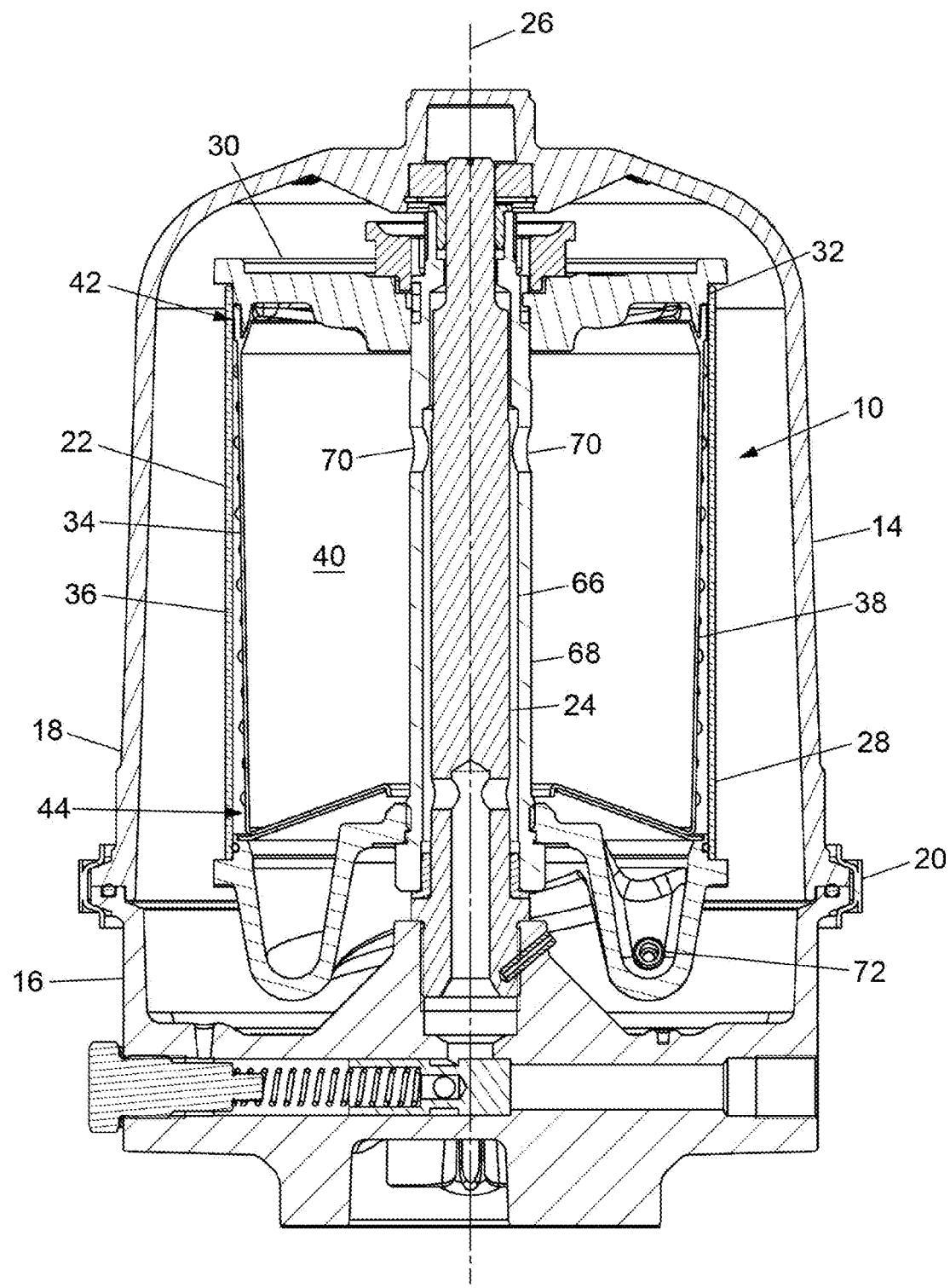
FIG. 1 is a cross-sectional view of a filter sub-assembly according to an embodiment of the invention.
Figure 5:
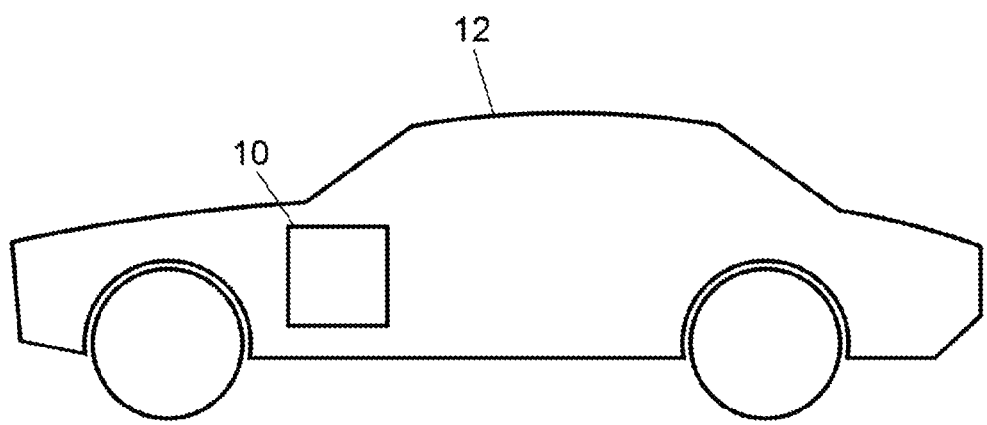
FIG. 5 is schematic view of a vehicle comprising a filter sub-assembly according to an embodiment of the invention.

FIG. 1 shows a filter sub-assembly 10 according to an embodiment of the invention. The sub-assembly 10 may have particular application in a centrifugal filter of a motor vehicle 12 (see FIG. 5), for example for cleaning engine oil in an engine lubrication system. However, other applications are contemplated, including oil recovery and food production. FIG. 1 shows the sub-assembly 10 supported within a housing 14. The housing 14 may have a base 16 and a cover 18 that are separably attachable to one another such that the sub-assembly 10 may be introduced into and/or removed from within the housing 14. To this end, the base 16 and the cover 18 may be securable to one another by a ring clamp 20.

The sub-assembly 10 comprises a rotary vessel 22. A spindle 24 may extend from the base 16, upon which the rotary vessel 22 may be mountable in a manner to rotate about the spindle 24. As such, the spindle 24 may delimit/provide an axis of rotation 26 about which the rotary vessel 22 is rotatable. However, the axis of rotation 26 may be provided by any suitable means, for example a bearing arrangement. The rotary vessel 22 comprises a rotor body 28 and closure member 30. The closure member 30 is configured to close, that is at least partially cover over, an opening 32, for example an open end, of the rotor body 28. In certain embodiments, such as that illustrated in the accompanying figures, the closure member 30 closes the opening 32 by insertion of the closure member 30 into the opening 32. The rotor body 28 and the closure member 30 may be securable to one another by cooperating threaded portions provided on the rotor body 28 and the closure member 30. In certain embodiments, the rotor body 28 and the closure member 30 may securable to one another in the manner of a bayonet-type connector.

Figure 3:
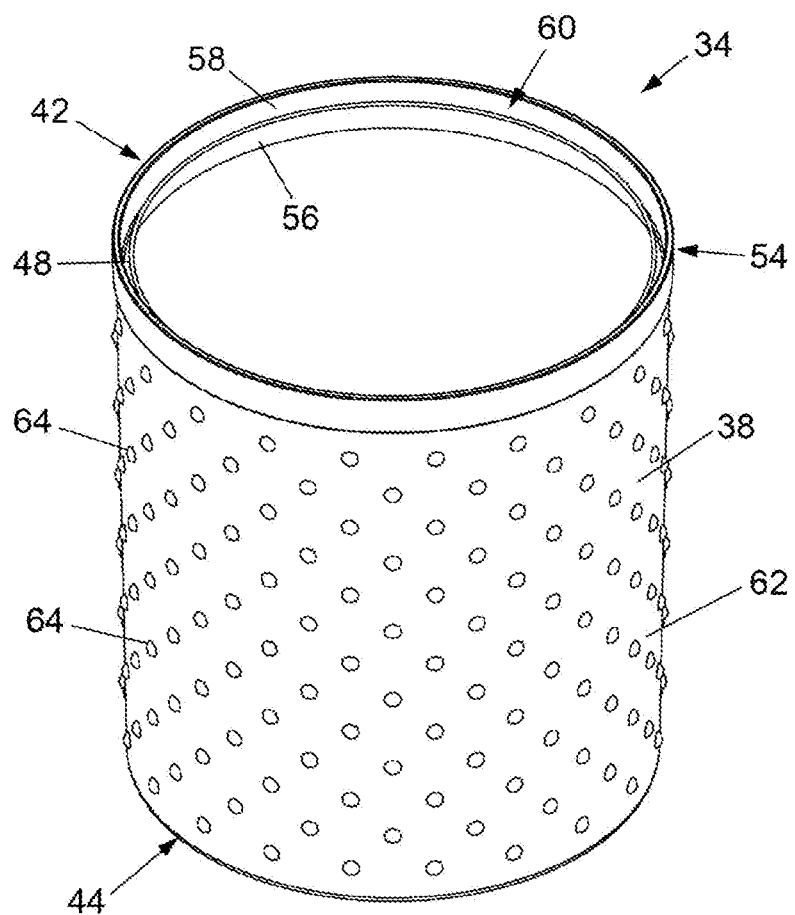
FIG. 3 is a perspective view of a liner of the filter sub-assembly that is illustrated in FIG. 1.

The sub-assembly 10 further comprises a liner 34 (FIG. 3 shows the liner 34 in isolation). The liner 34 is receivable within the rotor body 28 to line an inner surface 36 thereof and may be introduced into and/or removed from within the rotor body 28 through the opening 32. The liner 34 comprises a wall 38 to at least partially bound, that is surround or delimit, a chamber 40 within the rotor body 28 when the liner 34 is received therein. The chamber 40 may be partially bound by other components, including the rotor body 28 and the closure member 30. The wall 38 extends between opposing first and second ends 42, 44 of the liner 34. The wall 38 may be circumferential. As shown in the illustrated embodiment, each of the first and second ends 42, 44 may be a substantially open end of the liner 34.

Figure 2:
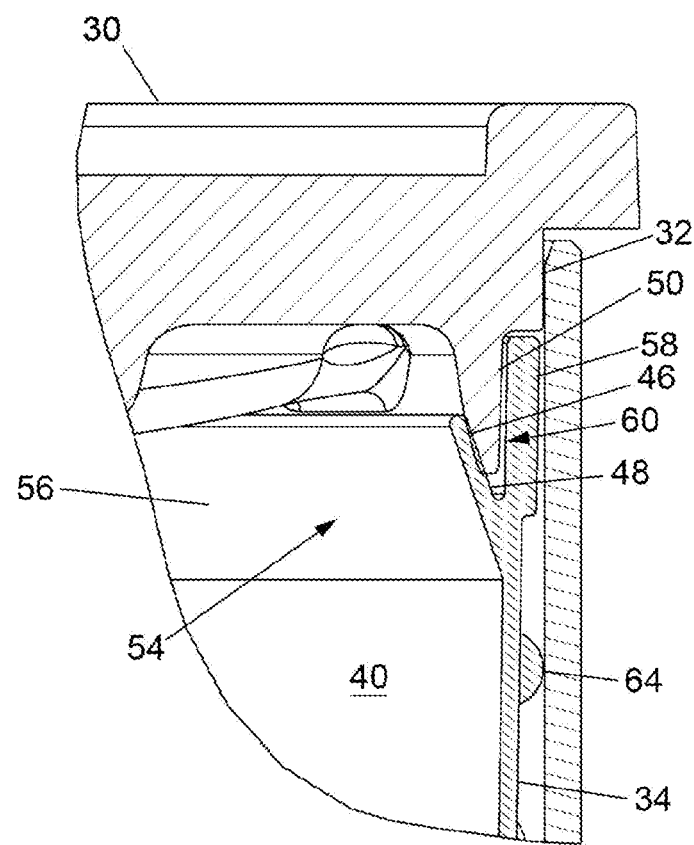
FIG. 2 is an enlarged region of the cross-sectional view of the filter sub-assembly that is illustrated in FIG. 1.

The liner 34 is sealable to the closure member 30 by a centrifugal force directed radially outwardly from the axis of rotation 26. To this end, the closure member 30 may comprise a radially inwardly facing sealing surface 46 and/or the liner 34 may comprise a radially outwardly facing sealing surface 48 (the radially inwardly facing sealing surface 46 and the radially outwardly facing sealing surface 48 are indicated in FIG. 2). As such, the radially outwardly facing sealing surface 48 may be sealable to the radially inwardly facing sealing surface 46 by the centrifugal force, as is described in more detail below. It should be understood that the radially inwardly facing sealing surface 46 is radially outward of the radially outwardly facing sealing surface 48 when the liner 34 is received within the rotor body 28 and the closure member 30 closes the opening 32. In the absence of the centrifugal force, the radially inwardly facing sealing surface 46 and the radially outwardly facing sealing surface 48 may be in contact with one another or be spaced apart from one another.

Figure 4:
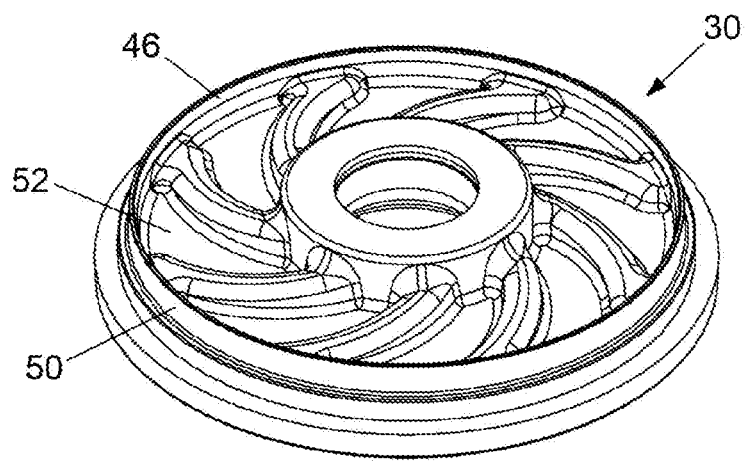
FIG. 4 is a perspective view of a closure member of the filter sub-assembly that is illustrated in FIG. 1.

The radially inwardly facing sealing surface 46 of the closure member 30 may be provided by a ridge 50, herein defined as a region, margin or border that is raised relative to a radially inward adjacent region of the closure member 30—and which, additionally, may be raised relative to a radially outward adjacent region of the closure member 30. In certain embodiments, such as that illustrated in the accompanying figures, the ridge 50 may be annular. The ridge 50 may extend from an inner region, or surface, 52 (indicted in FIG. 4) of the closure member 30 that may be exposed to the chamber 40 within the rotor body 28 when the closure member 30 closes the opening 32.

The radially outwardly facing sealing surface 48 of the liner 34 may be proximate the first end 44 of the liner 34, the first end 44 being proximate the opening 32 when the liner 34 is received within the rotor body 28. More specifically, an edge region 54 of the wall 38 proximate the first end 44 may provide the radially outwardly facing sealing surface 48. The radially outwardly facing sealing surface 48 may extend circumferentially about the wall 38 proximate the first end 44 of the liner 34. In certain embodiments, the edge region 54 may comprise a radially inwardly deflected portion 56 of the wall 38.

The deflected portion 56 may be inclined radially inwardly such that an obtuse angle is formed with the reminder of the wall 38. In such embodiments, the deflected portion 56 provides the radially outwardly facing sealing surface 48 of the liner 34. The deflected portion 56 may help ensure that the radially outwardly facing sealing surface 48 of the liner 34 is correctly located radially inward of the radially inwardly facing sealing surface 46 upon closing the opening 32 with the closure member 30. Additionally, or alternatively, the edge region 54 may comprise a projecting portion 58 of the wall 38. The projecting portion 58 may be disposed radially outwardly of the radially outwardly facing sealing surface 48 of the liner 34. In certain embodiments, the projecting portion 58 may project radially outwardly of the radially outwardly facing sealing surface 48 of the liner 34.

A channel 60 may be formed between the radially outwardly facing sealing surface 48 and the projecting portion 58. The radially inwardly facing sealing surface 46 of the closure member 30 may be receivable within the channel 60, for example the ridge 50 may be receivable within the channel 60. The projecting portion 58 may help ensure correctly locating the liner 34 within the rotor body 28, for example correctly locating the liner 34 relative to the closure member 30, as the projecting portion 58 may act as a spacer radially between the remainder of the wall 38 and the inner surface 36 of the rotor body 28, to create or maintain a space therebetween. More specifically, the projecting portion 58 may help ensure correctly locating the radially outwardly facing sealing surface 48 relative to the radially inwardly facing sealing surface 46. Additionally, or alternatively, the projecting portion 58 may help ensure correctly locating the closure member 30 within opening 32, as the projecting portion 58 may act as a spacer radially between the closure member 30, or a portion thereof, and the inner surface 36 of the rotor body 28, to create or maintain a space therebetween.

The liner 34 may comprise a resiliently deformable, that is resilient or elastically deformable, material. Suitable materials include silicone rubber materials. However, other materials are contemplated, including fibre reinforced polymers. In certain embodiments, the liner 34 may comprise reinforcing fibres that are orientated to extend circumferentially within the wall 38, at least substantially parallel to the first and second ends 42, 44, to maximise a hoop strength of the wall 38. Additionally, or alternatively, the reinforcing fibres may extend at least partially between the first and second ends 42, 44, to increase an axial strength of the wall 38. The liner 34 may be tapered, as this may facilitate removal of the liner 34 from within the rotor body 28. The liner 34 may be tapered in that a width of the liner 34 reduces between the first and the second ends 42, 44. The width may be measurable between opposing, for example diametrically opposing, points of the wall 38, at intervals extending between the first and second ends 42, 44. In certain embodiments, the width may reduce substantially linearly. At least a portion of an outermost surface 62 of the liner 34 may be textured, which may facilitate removal of the liner 34 from within the rotor body 28. As shown in the illustrated embodiment, the outermost surface may be textured in that it comprises a plurality of spaced apart protrusions 64. The liner 34 may be re-usable or intended for single use.

In certain embodiments, the liner 34 may be a substantially monolithic component, that is the liner may be formed as a single piece. As such, the liner 34 may be made out of a single material, for example a silicone rubber material, as above-described. However, the liner 34 may be a multi-part component, for example the edge region 54 of the wall 38 may be formed separately and/or formed of a different material to that of the remainder of the wall 38. In certain embodiments, only the edge region 54 may comprise the resiliently deformable material. Moreover, the edge region 54 may have a thickness different to a thickness of the remainder of the wall 38. In certain embodiments, the deflected portion 56 may have a thickness different to the thickness of the remainder of the wall 38 and/or a thickness of the projecting portion 58.

As shown in FIG. 1, the sub-assembly 10 may further comprise a fluid supply duct 66 extending through the rotor body 28 to supply the rotor body 28 with a working fluid, that is a fluid to cleaned/filtered. For example, the working fluid may be engine oil. The fluid supply duct 66 may be a bore formed in a bearing tube 68. The spindle 24 may be receivable within the bearing tube 68 to mount the rotary vessel 22 onto the spindle 24. The rotor body 28 may be fluidly connectable to the fluid supply duct 66 by one or more through bores 70 provided in the bearing tube 66. In use, the working fluid may be supplied to the supply duct 66 at an elevated pressure to flow from the through bores 70 into the chamber 40 within the rotor body 28.

The rotary vessel 22 may be self-powerable, for example a pressurised supply of working fluid to the rotor body 28 may drive rotation of the rotary vessel 22. To this end, the rotor body 28 may comprise a pair of diametrically opposed nozzles 72 at a radial distance from the bearing tube 66 (only one of the nozzles 72 is visible in the cross-sectional view illustrated in FIG. 1). Other configurations of the nozzles 72 may be possible, for example the rotor body 28 may comprise three or more of the nozzles 72. Each of the nozzles 72 may be configured to eject working fluid from the rotor body 28 in a direction generally tangential to the rotor body 28. As the skilled reader will understand, the tangential emission of pressurised working fluid generates a reactive force that may cause rotation of the rotor body 28 relative to the base 16. However, the rotary vessel 22 may be powered by any suitable means, for example an electric motor may drive rotation of the rotary vessel 22.

In use, the centrifugal force—an inertial force arising from rotation of the rotary vessel—acts on the liner 34 to force the radially outwardly facing sealing surface 48 against the radially inwardly facing sealing surface 46, thus effecting a seal therebetween to retain fluid within the chamber 40. The seal at least inhibits the working fluid from exiting the rotor body 28 though the opening 32. In certain embodiments, a portion of the liner 34, or at least the edge region 54, may deform in response to the centrifugal force acting on the liner 34, moving radially outward, to effect the seal between the liner 34 and the closure member 30. In this manner, the liner 34 may seal against the closure member 30. The radially inwardly deflected portion 56 may deform to effect the seal between the liner 34 and the closure member 30.

As working fluid flows through the rotor body 28, and thus through the chamber 40, the centrifugal force also causes separation of contaminant material within the working fluid. Separated contaminant material may accumulate within the chamber 40, primarily as a cake adhering to the wall 38 the liner 34. Cleaned/filtered working fluid exits the rotor body 28, for example through the nozzles 72, and may drain to a sump. As contaminant accumulates within the chamber 40, within the liner 34, the rotary vessel 22 must be serviced to empty the liner 34 of the agglomerated contaminant particulate matter. The frequency of servicing will vary depending on the embodiment, the operating environment and the number of operating hours. To service the rotary vessel 22, the opening 32 is opened, for example by removal of the closure member 30 from the opening 32, which will expose the liner 34 within the rotor body 28. Consequently, the liner 34 is removable from the rotor body 28, along with the separated contaminant particulate matter contained therein.

The rotary vessel 22 is not rotating when being serviced, so there is no centrifugal force acting on the liner 34 to force the liner 34 against the closure member 30. In certain embodiments, the inherent resiliency of the liner 34, or at least the edge region 54, may cause the liner 34 to recover from deformation exhibited in response to the centrifugal force acting on the liner 34. Such recovery may break, or at least weaken, the seal between the liner 34 and the closure member 30 and improve the ease with which the opening 32 is opened, for example by reducing friction acting between the closure member 30 and the liner 34 exhibited in response to the centrifugal force acting on the liner 34.

The liner 34 may be washed, or otherwise suitably cleaned, before being returned to the rotor body 28. Flexion of the liner 34 may facilitate the removal of separated contaminant particulate adhered to the wall 38. Upon returning the liner 34 to the rotor body 28, or inserting a new/replacement liner 34, the projecting portion 58 may guide the closure member 30 into the opening 32 to help ensure the liner 34 is correctly located in the rotor body 28, by taking up otherwise free space radially between the rotor body 28 and closure member 30. The liner 34 may negate a requirement for further seal, for example an O-ring seal, to seal the rotor body 28 to the closure member 30. Typically, such seals between the rotor body 28 and the closure member 30 must be compressed to inhibit the working fluid from exiting the rotor body 28 though the opening 32. However, the compression of such seals can hinder the assembly of the sub-assembly 10.

The invention is not restricted to the details of any foregoing embodiments. For example, the radially inwardly facing sealing surface 46 of the closure member 30 may be provided by a recess, herein defined as a region, margin or border that is set down relative to the radially inward adjacent region of the closure member 30—and which, additionally, may be set down relative to the radially outward adjacent region of the closure member 30. The recess may be annular. The recess may extend into the inner region 52 of the closure member 30. The liner 34 may extend into the recess when received within the rotor body 28 and the closure member 30 closes the opening 32.

Moreover, in certain embodiments, the closure member 30 may comprise the radially outwardly facing sealing surface 48 and the liner 34 may comprise the radially inwardly facing sealing surface 46. In such embodiments, it may be the closure member 30, or at least a portion there of, that deforms in response to the centrifugal force such that the closure member 30 seals against the liner 34. Generally, in embodiments of the invention, the liner 34 is receivable within the rotor body 28 to line the inner surface 36 of the rotor body 28 and the liner 34 is fluidly sealable to the closure member 30 when the liner 34 is received within the rotor body 28 and the closure member 30 closes the opening 32.

All of the features disclosed in this specification (including the accompanying claims and figures) and/or all of the steps of any method or process so disclosed, may be combined in any combination, except combinations where at least some of such features and/or steps are mutually exclusive.

The invention extends to any novel one, or any novel combination, of the features disclosed in this specification (including the accompanying claims and figures) or to any novel one, or any novel combination, of the steps of any method or process so disclosed. The claims should not be construed to cover merely the foregoing embodiments, but also any embodiments which fall within the scope of the claims.

Each feature disclosed in this specification (including the accompanying claims and figures), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A filter sub-assembly comprising:
    a rotary vessel having
        a rotor body and
        a closure member to close an opening of the rotor body; and
    a liner receivable within the rotor body to line an inner surface thereof and fluidly sealable to the closure member by a centrifugal force directed radially outwardly from an axis of rotation about which the rotary vessel is rotatable,
    wherein the liner comprises:
        a radially outwardly facing sealing surface, relative to the axis of rotation, which is fluidly sealable against the closure member by the centrifugal force; and
        a wall extending between opposing first and second ends of the liner, the wall having an edge region proximate the first end that provides the radially outwardly facing sealing surface.

2. The filter sub-assembly according to claim 1, wherein the closure member comprises a radially inwardly facing sealing surface, relative to the axis of rotation, against which the liner is fluidly sealable by the centrifugal force.

3. The filter sub-assembly according to claim 2, wherein the closure member comprises
    a ridge that provides the radially inwardly facing sealing surface.

4. The filter sub-assembly according to claim 1, wherein the liner is fluidly sealable to the closure member in that the liner, or at least a portion thereof, is deformable by the centrifugal force to seal against the closure member.

5. The filter sub-assembly according to claim 1, wherein the liner is monolithic and formed of a resiliently deformable material.

6. The filter sub-assembly according to claim 1, wherein the edge region has a thickness different to that of the remainder of the wall, including one of a greater thickness and a lesser thickness than the remainder of the wall.

7. The filter sub-assembly according to claim 1, wherein the edge region comprises
    a radially inwardly deflected portion of the wall, relative to the axis of rotation, that provides the radially outwardly facing sealing surface.

8. The filter sub-assembly according to claim 7, wherein the radially inwardly deflected portion is deformable by the centrifugal force to seal against the closure member.

9. The filter sub-assembly according to claim 7, wherein the radially inwardly deflected portion has a thickness different to that of the remainder of the wall, including one of a greater thickness and a lesser thickness than the remainder of the wall.

10. The filter sub-assembly according to claim 1, wherein the edge region comprises
    a projecting portion disposed radially outwardly of the radially outwardly facing sealing surface, relative to the axis of rotation, to form a channel in which the radially inwardly facing sealing surface is receivable.

11. The filter sub-assembly according to claim 10, wherein
    the projecting portion provides a spacer to create or maintain a space between the inner surface of the rotor body and the wall and/or between the inner surface of the rotor body and the closure member or a portion thereof.

12. The filter sub-assembly according to claim 10, wherein
    the projecting portion has a thickness different to that of the remainder of the wall, including one of a greater thickness and a lesser thickness than the remainder of the wall.

13. The filter sub-assembly according to claim 1, wherein the opening of the rotor body is closable by at least partial insertion of the closure member into the opening.

14. The filter sub-assembly according to claim 1, wherein the opening of the rotor body is an open end of the rotor body.

15. The filter sub-assembly according to claim 1, wherein the rotor body comprises a pair of diametrically opposed nozzles, relative to the axis of rotation, configured to eject a working fluid from the rotor body in a direction generally tangential to the rotor body.

16. A centrifugal filter comprising:

the filter sub-assembly according to claim 1; and a housing within which the filter sub-assembly is supported, the housing having a base and a cover attachable to one another to at least introduce the filter sub-assembly into the housing.

17. The centrifugal filter according to claim 16, the centrifugal filter comprising a spindle extending from the base upon which the rotary vessel is mountable to rotate about the spindle, the spindle delimiting the axis of rotation.

18. A vehicle comprising a centrifugal filter according to claim 16.

* * * * *